United States Patent
Chen et al.

(10) Patent No.: US 11,608,170 B2
(45) Date of Patent: Mar. 21, 2023

(54) BUOY POSITION MONITORING METHOD AND BUOY POSITION MONITORING SYSTEM

(71) Applicant: NATIONAL YUNLIN UNIVERSITY OF SCIENCE AND TECHNOLOGY, Yunlin County (TW)

(72) Inventors: Ching-Ju Chen, Yunlin County (TW); Chuan-Yu Chang, Yunlin County (TW); Chia-Yan Cheng, Tainan (TW); Meng-Syue Li, Kaohsiung (TW); Yueh-Min Huang, Tainan (TW)

(73) Assignee: NATIONAL YUNLIN UNIVERSITY OF SCIENCE AND TECHNOLOGY, Yunlin County (TW)

( * ) Notice: Subject to any disclaimer, the term of this patent is extended or adjusted under 35 U.S.C. 154(b) by 313 days.

(21) Appl. No.: 16/845,048

(22) Filed: Apr. 9, 2020

(65) Prior Publication Data
US 2020/0324897 A1    Oct. 15, 2020

(30) Foreign Application Priority Data
Apr. 11, 2019   (TW) ................................ 108112744

(51) Int. Cl.
*B64C 39/02* (2023.01)
*B63B 22/00* (2006.01)
(Continued)

(52) U.S. Cl.
CPC ............ *B64C 39/024* (2013.01); *B63B 22/00* (2013.01); *G08G 5/0034* (2013.01);
(Continued)

(58) Field of Classification Search
CPC .................................................. B64C 39/024
See application file for complete search history.

(56) References Cited

U.S. PATENT DOCUMENTS

| 11,112,395 | B2* | 9/2021 | Pariseau | G01N 1/2273 |
| 2007/0222674 | A1* | 9/2007 | Tan | G01S 19/49 |
| | | | | 342/357.32 |
| 2019/0387416 | A1* | 12/2019 | Carpenter | G08G 5/006 |

FOREIGN PATENT DOCUMENTS

| KR | 2009100941 | A | * | 9/2009 |
| KR | 101801033 | B1 | * | 11/2017 |

OTHER PUBLICATIONS

He, Pingguo, Technologies for the Marking of Fishing Gear to Identify Gear Components Entangled on Marine Animals and to reduce abandoned, lost or otherwise discarded fishing gear, Marine Pollution Bulletin, vol. 129, Issue 1, Apr. 2018, pp. 253-261 (https://www.sciencedirect.com/science/article/pii/S0025326X.*

* cited by examiner

*Primary Examiner* — Jean Paul Cass
(74) *Attorney, Agent, or Firm* — CKC & Partners Co., LLC

(57) ABSTRACT

A buoy position monitoring method includes a buoy positioning step, an unmanned aerial vehicle receiving step and an unmanned aerial vehicle flying step. In the buoy positioning step, a plurality of buoys are put on a water surface. Each of the buoys is capable of sending a detecting signal. Each of the detecting signals is sent periodically and includes a position dataset of each of the buoys. In the unmanned aerial vehicle receiving step, an unmanned aerial vehicle is disposed on an initial position, and the unmanned aerial vehicle receives the detecting signals. In the unmanned aerial vehicle flying step, when at least one of the buoys is lost, the unmanned aerial vehicle flies to a predetermined position to get contact with the at least one buoy that is lost.

9 Claims, 6 Drawing Sheets

(51) Int. Cl.
*H04W 4/029* (2018.01)
*G08G 5/00* (2006.01)

(52) U.S. Cl.
CPC ....... *H04W 4/029* (2018.02); *B63B 2022/006* (2013.01); *B64C 2201/12* (2013.01)

BUOY POSITION MONITORING METHOD AND BUOY POSITION MONITORING SYSTEM

RELATED APPLICATIONS

This application claims priority to Taiwan Application Serial Number 108112744, filed Apr. 11, 2019, which is herein incorporated by reference.

BACKGROUND

Technical Field

The present disclosure relates to a position monitoring method and a position monitoring system. More particularly, the present disclosure relates to a buoy position monitoring method and a buoy position monitoring system.

Description of Related Art

Investigations of nearshore current fields are important for plans and constructions in coastal engineering, marine pollution monitoring and coastal evolution. Since the nearshore current is easily affected by the features and structures of the coastal, simultaneous observations in multiple areas or points are required in order to find out the effects from the coastal features and water depth. In the past, the information of nearshore current fields is obtained by tracking and positioning floating sticks on the water via a boat. Then, drifting buoys with radio waves are developed and the drifting buoys can be tracked by a coastal station, and after development of the satellite technique, GPS drifting buoys substitute for the drifting buoys with radio waves. However, portable drifting buoys with GPS are expansive and may be lost during operation; as a result, the number of the buoys used in ocean or river monitoring is limited owing to the cost, and it is hard to carry out full field and large scale investigations for water flow fields.

Recently, the price of a portable drifting buoy made by a personal digital assistant (PDA) in association with a GPS module (or a smart phone with a GPS modules), a radio module or a 3G wireless communication technology is up to 40 thousands. Nevertheless, the horizontal error of GPS is about 10 m. Hence, the price of the portable drifting buoy needs to be lowered while the accuracy of GPS needs to the increased.

Based on the abovementioned problems, there is a need to develop a buoy position monitoring method to lower the cost of the surface drifting buoy such that a plurality of drifting buoys can be employed for full field investigations in nearshore current fields.

SUMMARY

According to one aspect of the present disclosure, a buoy position monitoring method is provided. The buoy position monitoring method includes a buoy positioning step, an unmanned aerial vehicle receiving step and an unmanned aerial vehicle flying step. In the buoy positioning step, a plurality of buoys are put on a water surface. Each of the buoys is capable of sending a detecting signal. Each of the detecting signals is sent periodically and includes a position dataset of each of the buoys. In the unmanned aerial vehicle receiving step, an unmanned aerial vehicle is disposed on an initial position, and the unmanned aerial vehicle receives the detecting signals. In the unmanned aerial vehicle flying step, when at least one of the buoys is lost, the unmanned aerial vehicle flies to a predetermined position to get contact with the at least one buoy that is lost.

According to another aspect of the present disclosure, a buoy position monitoring system is provided. The buoy position monitoring system includes a plurality of buoys and an unmanned aerial vehicle. Each of the buoys includes a detecting and communicating unit capable of sending a detecting signal, and the detecting signal includes a position dataset. The unmanned aerial vehicle includes a communicating unit signally connected to the detecting and communicating unit, and the communicating unit receives the detecting signals. When at least one of the buoys is lost, the unmanned aerial vehicle flies to a predetermined position to get contact with the at least one buoy that is lost.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other elements, or it can be indirectly disposed on, connected or coupled to the other elements, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
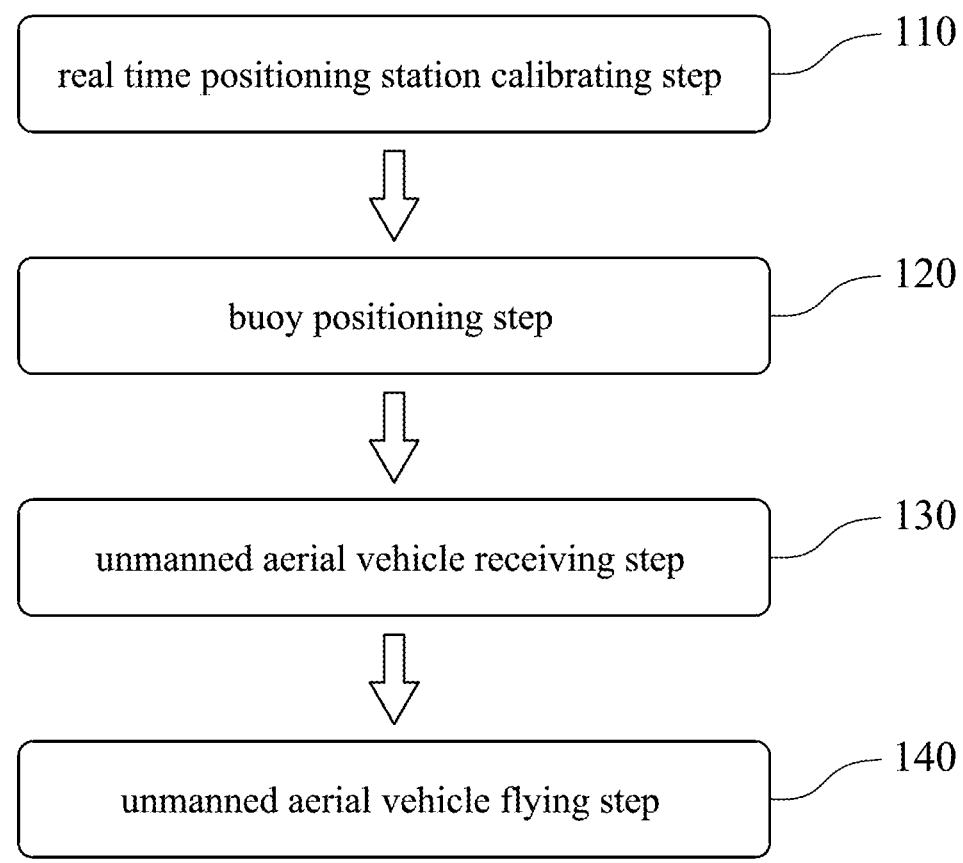
FIG. 1 shows a block diagram of a buoy position monitoring method according to one embodiment of the present disclosure.
Figure 2:
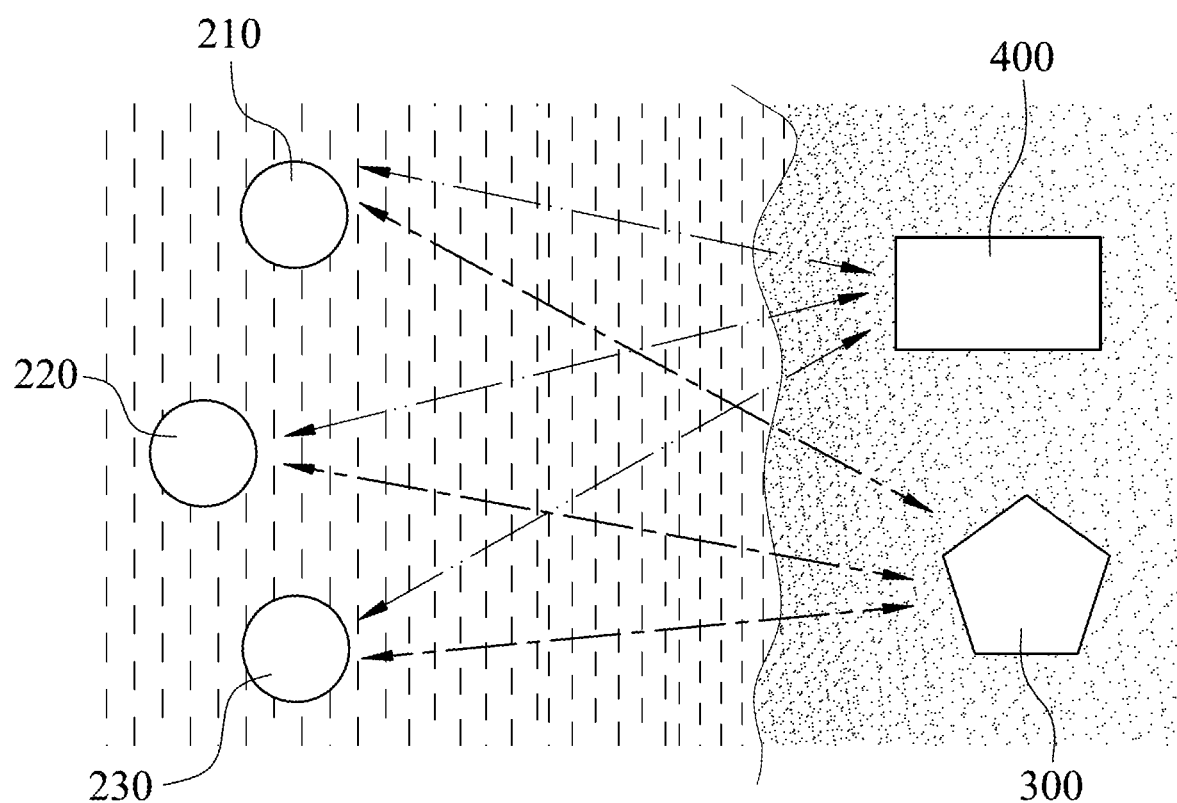
FIG. 2 shows one illustration of the buoy position monitoring method of FIG. 1.
Figure 3:
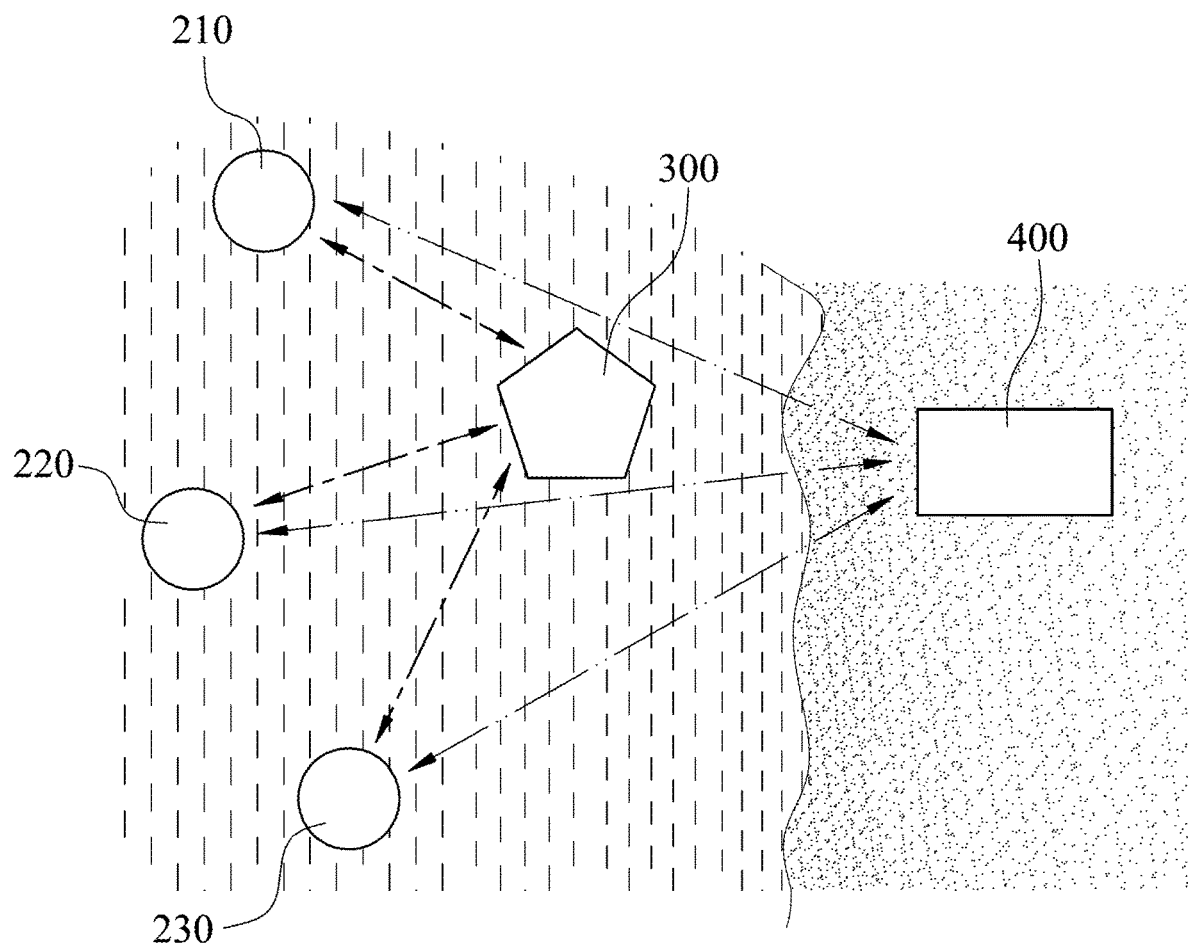
FIG. 3 shows another illustration of the buoy position monitoring method of FIG. 1.

FIG. 1 shows a block diagram of a buoy position monitoring method 100 according to one embodiment of the present disclosure. FIG. 2 shows one illustration of the buoy position monitoring method 100 of FIG. 1. FIG. 3 shows another illustration of the buoy position monitoring method 100 of FIG. 1. The buoy position monitoring method 100 includes a buoy positioning step 120, an unmanned aerial vehicle receiving step 130 and an unmanned aerial vehicle flying step 140.

In the buoy positioning step 120, a plurality of buoys 210, 220 and 230 are put on a water surface. Each of the buoys 210, 220 and 230 is capable of sending a detecting signal.

Each of the detecting signals is sent periodically and includes a position dataset of each of the buoys 210, 220 and 230.

In the unmanned aerial vehicle receiving step 130, an unmanned aerial vehicle 300 is disposed on an initial position, and the unmanned aerial vehicle 300 receives the detecting signals.

In the unmanned aerial vehicle flying step 140, when at least one of the buoys 210, 220 and 230, e.g., the buoys 210 and 220, are lost, the unmanned aerial vehicle 300 flies to a predetermined position to get contact with the buoys 210 and 220.

Therefore, even if the buoys 210, 220 and 230 float to a far place, the buoys 210, 220 and 230 can still get contact with the unmanned aerial vehicle 300 owing to the flexibility thereof; hence, current status of far places can be collected, thereby assisting latter analysis. The details of the buoy position monitoring method 100 will be described hereafter.

In the buoy positioning step 120, the buoys 210, 220 and 230 can be put on an estuary or a port, and the buoys 210, 220 and 230 can be put on the estuary or the port from a time of a high tide, and, after experiencing a lower tide, the buoys 210, 220 and 230 can be withdrawn at the next high tide while a measuring time period of each of the buoys 210, 220 and 230 is longer than 12 hours. Each of the buoys 210, 220 and 230 can include a detecting and communicating unit. When the buoys 210, 220 and 230 float on the water surface, the position datasets of the buoys 210, 220 and 230 will keep updating, and the updated position datasets can be transmitted to the unmanned aerial vehicle 300 in the unmanned aerial vehicle receiving step 130.

Moreover, in the unmanned aerial vehicle receiving step 130, the unmanned aerial vehicle 300 is remained static in the initial position of the shore to receive and store the detecting signals from the buoys 210, 220 and 230. The battery of the unmanned aerial vehicle 300 can be replaced and a flying route of the unmanned aerial vehicle 300 can be set in the initial position. The unmanned aerial vehicle 300 can communicate with the buoys 210, 220 and 230 via a wireless communication technology, especially a low-power wide-area network (LPWA) technology, e.g., the long range wide area network (LoRaWAN or LoRa). In the embodiment of FIGS. 2 to 3, each of the buoys 210, 220 and 230 can be served as the end-device of LoRa, and the unmanned aerial vehicle 300 can be served as the gateway of LoRa to receive the detecting signals from the buoys 210, 220 and 230. In other embodiments, other communication technologies can be used, and the present disclosure is not limited thereto.

Because the buoys 210, 220 and 230 will float freely on the water surface, the distances between the buoys 210, 220 and 230 and the unmanned aerial vehicle 300 may exceed the transmitting and receiving distance of LoRa. Hence, in the unmanned aerial vehicle flying step 140, the unmanned aerial vehicle 300 will, as shown in FIG. 3, fly from the initial position to a predetermined position to shorten the distances so as to get contact with any lost one of the buoys 210, 220 and 230 again.

Furthermore, when the buoys 210 and 220 are lost, each of the buoys 210 and 220 is given a weight according to a lost time period thereof. The predetermined position is calculated on the basis of the weights and last positions of the buoys 210 and 220, and each of the position datasets sent by each of the buoys 210 and 220 to the unmanned aerial vehicle 300 just before each of the lost time periods can be defined as the last position.

Precisely, each of the detecting signals can be, for example, transmitted by the buoys 210, 220 and 230 per second, and a lost buoy which loses touch with the unmanned aerial vehicle 300 can be defined as any one of the buoys 210, 220 and 230 whose detecting signal is not received by the unmanned aerial vehicle 300. The lost time period is counted from the moment that the unmanned aerial vehicle 300 dose not receive the detecting signal from the lost buoy, and the weight is given according to the length of the lost time period. In other words, the buoys 210, 220 and 230 may float to a far place as long as the lost time period becomes longer, and a large weight is given to the lost buoy having long lost time period while a small weight is given to the lost buoy having a short lost time period. The weight can be, for example, set as the ratio of each of the lost time periods of each of the lost buoys to the sum of all of the lost time periods. A barycenter coordinate of the lost buoys can be $(\Sigma_{i=1}^{n} m_i x_i, \Sigma_{i=1}^{n} m_i y_i)$. n represents a number of the lost buoys, i.e., the buoys 210 and 220, and in the present embodiment, n is equal to 2. $x_i$ and $y_i$ represent the longitude and the latitude of the last positions of the lost buoy, respectively. $m_i$ represents the weight, and a sum of the weights is equal to 1. A critical value can be set in advance, as long as the unmanned aerial vehicle 300 dose not receive the detecting signal of at least one of the buoys 210, 220 and 230 for a period that exceeds the critical value, loss of the at least one of the buoys 210, 220 and 230 can be confirmed. The lost time period can be substituted by the package loss rate or the strength of the signals, and the present disclosure is not limited thereto. When the barycenter coordinate is severed as the predetermined position, the unmanned aerial vehicle 300 can fly to a position near the farthest one of the lost buoys, and can get into contact with the lost buoys again.

In other embodiments, the lost buoys are sequenced by the unmanned aerial vehicle, and the one having the longest lost time period (or the highest package loss rate, or the weakest signal) is put in the first place of the sequence. The unmanned aerial vehicle can fly in a direction toward the lost buoy that is in the first place, and after getting contact therewith, the unmanned aerial vehicle can fly in another direction toward another lost buoy that is in the second place.

Furthermore, in the unmanned aerial vehicle flying step 140, as the unmanned aerial vehicle 300 arrives the predetermined position, a plurality of requesting signals are sent to the two buoys 210 and 220, and each of the buoys 210 and 220 sends a feedback signal with a plurality of stored position datasets which are detected during the lost time period to the unmanned aerial vehicle 300 after receiving the requesting signal. Hence, the unmanned aerial vehicle 300 can receive all the stored position datasets in the lost time period to remain whole datasets.

In additional, in the unmanned aerial vehicle flying step 140, after the unmanned aerial vehicle 300 receives all of the stored position datasets detected during the lost time periods of the feedback signals from the buoys 210 and 220, the predetermined position is recalculated as long as at least another one of the buoys 210, 220 and 230, e.g., the buoy 230, is lost. Because the buoys 210, 220 and 230 keep floating, the buoys 210, 220 and 230 may be possible to lose touch with the unmanned aerial vehicle 300 at any time, or the buoys 210, 220 and 230 may lose touch with the unmanned aerial vehicle 300 after the position of the unmanned aerial vehicle 300 is changed; consequently, there is a need for the unmanned aerial vehicle 300 to confirm that whether at least one of the buoys 210, 220 and 230 is lost.

If yes, the barycenter is recalculated by the method shown above and can be served as the new predetermined position. The unmanned aerial vehicle 300 can then fly to the new predetermined position.

Figure 4:
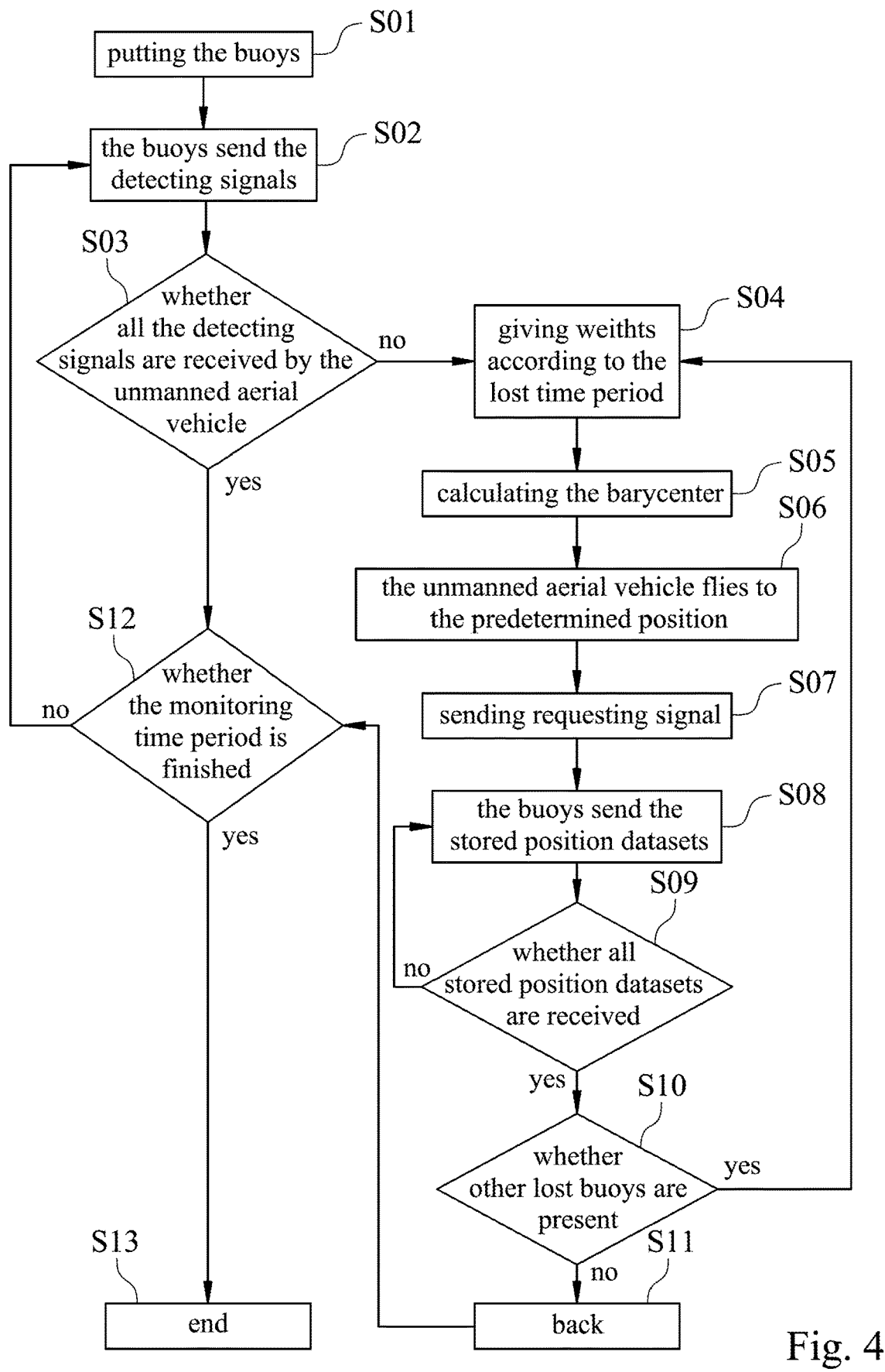
FIG. 4 shows a flow chart of the buoy position monitoring method of FIG. 1.

FIG. 4 shows a flow chart of the buoy position monitoring method of FIG. 1. Please refer to FIG. 4 with reference to FIGS. 1 to 3 describing the buoy position monitoring method 100. In Step S01 and Step S02, the buoys 210, 220 and 230 can be put on an estuary or a port, and each of the detecting signals of each of the buoys 210, 220 and 230 is sent periodically. In Step S03, whether all the detecting signals of all of the buoys 210, 220 and 230 are received by the unmanned aerial vehicle 300 is checked. If yes, Step S12 is executed to confirm whether the monitor time period is finished. If the monitor time period is not finished, the unmanned aerial vehicle 300 will keep receiving the detecting signals from the buoys 210, 220 and 230, but if the monitor time is finished, Step S13 is executed to stop monitoring. On the contrary, in Step S03, if the detecting signals of at least one of the buoys 210, 220 and 230, e.g., the buoys 210 and 220, are not received by the unmanned aerial vehicle 300, Step S04 and Step S05 are executed to give weights to each of the buoys 210 and 220 based on their lost time periods. Then the barycenter is calculated in association with the last positions, and the barycenter can be served as the predetermined position. Subsequently, Step S06 can be executed and the unmanned aerial vehicle 300 can fly to the predetermined position.

After the unmanned aerial vehicle 300 has arrived the predetermined position, Step S07 is executed. Requesting signals are sent to request the buoys 210 and 220 to request all of the stored positions in the lost time period. Then Step S08 is executed by the buoys 210 and 220, and Step S09 is executed by the unmanned aerial vehicle 300 to receive all of the stored positions. After receiving all of the stored positions, Step S10 is executed to confirm whether another one of the buoys 210, 220 and 230 is lost. If yes, execute Step S04 to Step S10 again until there is no lost buoy. Finally, the unmanned aerial vehicle 300 executes Step S11 to go back to the initial position and return to Step S12.

In the embodiment of FIGS. 1 to 4, the real-time kinematics (RTK) can be associated to increase the position accuracy. Therefore, as shown in FIGS. 1 and 2, the buoy position monitoring method 100 can further include a real time positioning station calibrating step 110. A real time positioning station 400 is provided, and a coordinate of the real time positioning station 400 is calibrated. As a result, the real time positioning station 400 can be served as a RTK correction station of the buoys 210, 220 and 230, and each coordinates of each of the buoys 210, 220 and 230 has to be calibrated to insure the accuracy of the correcting signals. The calibration of the real time positioning station 400 is to transfer the RTK of the real time positioning station 400 into a base mode for 10 minutes to correct base coordinates, and the average signals are selected to correct the coordinates.

Therefore, in the buoy positioning step 120, a GPS dataset can be sent by each of the buoys 210, 220 and 230 to the real time positioning station 400, and a differential correction corresponding to each of the GPS datasets is sent by the real time positioning station 400 to each of the buoys 210, 220 and 230. Each of the position datasets can be calculated according to the GPS dataset and the differential correction corresponding thereto. Through correction of the GPS dataset by the differential correction, a precise position dataset can be obtained. In the embodiment, each of the buoys 210, 220 and 230 can employ Reach Device from EMLID (EMLID Reach).

Based on the abovementioned, the unmanned aerial vehicle 300 can receive the position datasets of all of the buoys 210, 220 and 230, and precise position datasets can be obtained in association with RTK. Furthermore, the position datasets can be calculated by Eulerian current measurement or Lagrangian current measurement to analyze the nearshore current filed.

Figure 5:
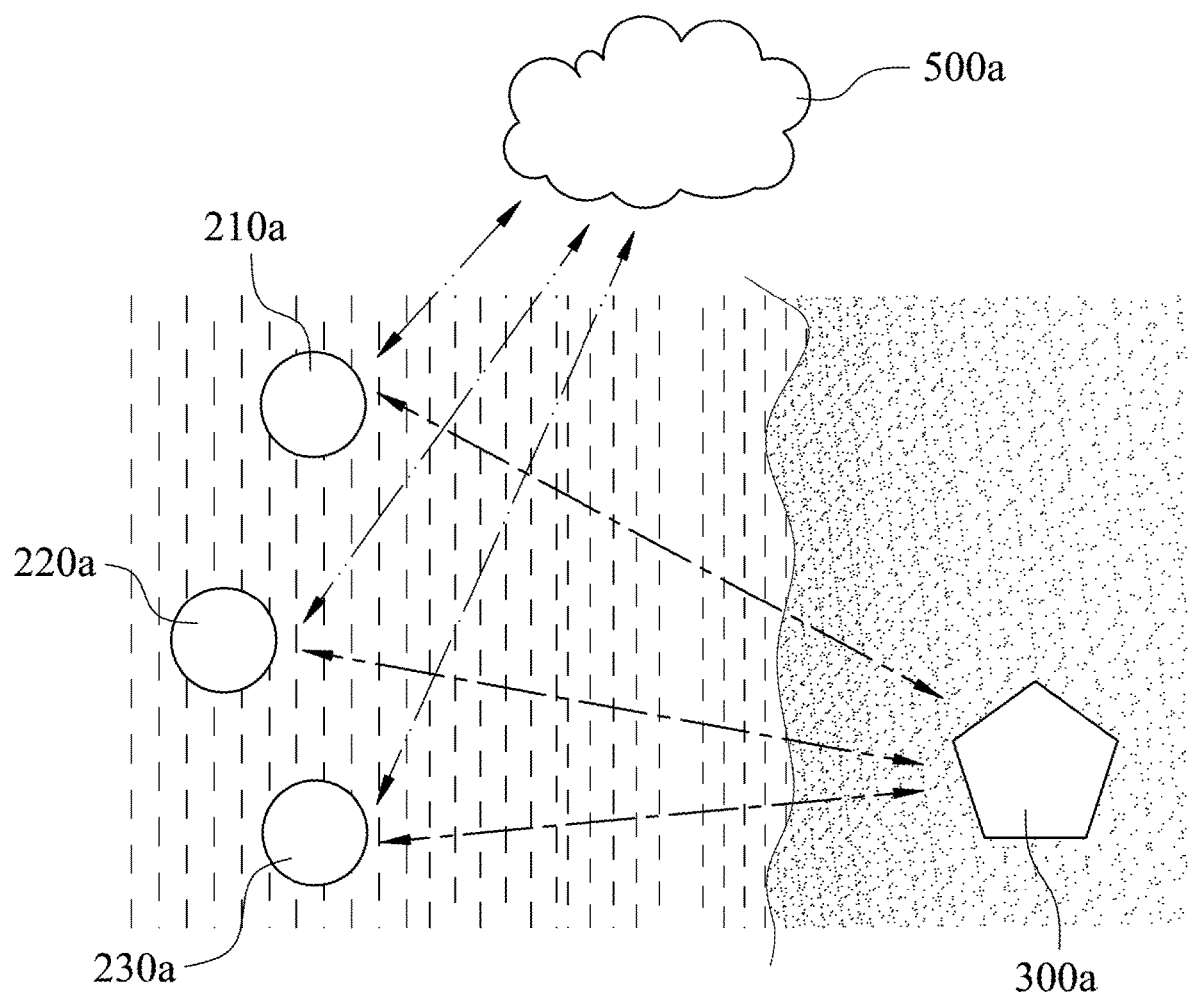
FIG. 5 shows an illustration of a buoy position monitoring method according to another embodiment of the present disclosure.

FIG. 5 shows an Illustration of a buoy position monitoring method according to another embodiment of the present disclosure. The buoy position monitoring method of FIG. 5 is similar to the buoy position monitoring method 100 of FIG. 1, but the difference is that the buoys 210a, 220a and 230a are signally connected to a RTK cloud 500a for calibration. Hence, the real time positioning station 400 is not required in the embodiment of FIG. 5 and the real time positioning station calibrating step can be omitted. In the embodiment, the RTK cloud 500a is illustrated as an electronic global navigation satellite system (e-GNSS) produced by Taiwan national land surveying and mapping center. The real time positioning station is disposed at a fixed position and uses RTK equipment to converge the data. The e-GNSS provides a virtual base station according to the stations nearby. Both of the real time positioning station and the e-GNSS can receive the GPS datasets from the buoys 210a, 220a and 230a and provide corresponding differential corrections to allow the buoys 210a, 220a and 230a to obtain precise position datasets. Moreover, the detecting signals form the buoys 210a, 220a and 230 a can be received by the unmanned aerial vehicle 300a.

Figure 6:
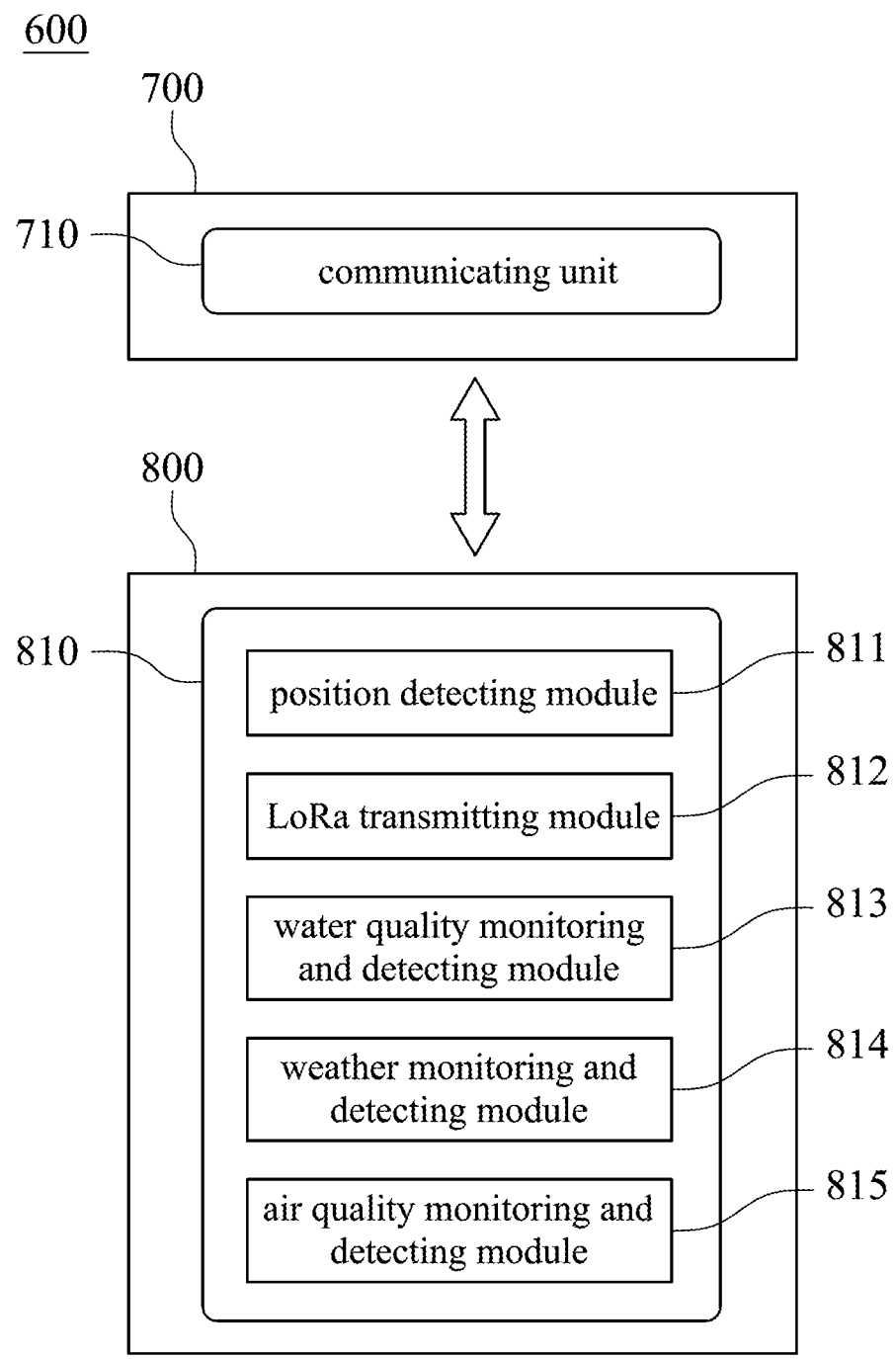
FIG. 6 shows a block diagram of a buoy position monitoring system according to yet another embodiment of the present disclosure.

FIG. 6 shows a block diagram of a buoy position monitoring system 600 according to yet another embodiment of the present disclosure. The buoy position monitoring system 600 includes a plurality of buoys 800 and an unmanned aerial vehicle 700. Each of the buoys 800 includes a detecting and communicating unit 810 capable of sending a detecting signal including a position dataset. The unmanned aerial vehicle 700 includes a communicating unit 710 signally connected to the detecting and communicating unit 810, and the communicating unit 710 receives the detecting signals. When at least one of the buoys 800 is lost, the unmanned aerial vehicle 700 flies to a predetermined position to get contact with the at least one buoy 800 that is lost.

An acrylic storage bottle can be served as a main body of each of the buoys 800. A proper amount of cement are concreted in the main body, and a stainless steel sheet having a width of 1.5 mm is disposed inside the main body to be configured for securing the detecting and communicating unit 810. In the embodiment, double layer stainless rings and a knit rope can be served as baffle plates of the buoys. Hence, the heat dissipation problem can be solved, and there is a freedom to adjust the depth of the baffle plates.

The buoy position monitoring system 600 can further include a real time positioning station (not shown) signally connected to the buoys 800. The real time positioning station receives a GPS dataset from each of the buoys 800 and sends a differential correction corresponding to each of the GPS datasets. The position dataset of each of the buoys is calculated according to the GPS dataset and the differential correction corresponding thereto.

In addition, the detecting and communicating unit 810 can include a position detecting module 811 and a LoRa transmitting module 812. The position detecting module 811 is configured to obtain the GPS dataset. The position detecting module 811 is signally connected to the real time positioning station, and calculates the position dataset according to the GPS dataset and the differential correction corresponding thereto. The LoRa transmitting module 812 is signally connected to the position detecting module 811 and is configured to send the detecting signal.

In other words. The position detecting module 811 is capable of obtaining the GPS datasets and to send the GPS datasets to the real time positioning station. In other embodiments, the position detecting module sends the GPS dataset to the host of e-GNSS via a wireless transmission method after obtaining the GPS dataset, and the host feedbacks the satellite observation data (in RTCM SC-104 standard data format) of a virtual base station (VBS) to the position detecting module, but the present disclosure is not limited thereto.

Furthermore, the buoy position monitoring system 600 can further include a water quality monitoring and detecting module 813, a weather monitoring and detecting module 814 and an air quality monitoring and detecting module 815. The water quality monitoring and detecting module 813 is configured to provide a water dataset and is signally connected to the LoRa transmitting module 812. The weather monitoring and detecting module 814 is configured to provide a weather dataset and is signally connected to the LoRa transmitting module 812. The air quality monitoring and detecting module 815 is configured to provide an air dataset and is signally connected to the LoRa transmitting module 812. The detecting signal of each of buoys 800 includes the water dataset, the weather dataset and the air dataset.

The water monitoring and detecting module 813 can collect the liquid leakage volume to measure the contents of the salinity in the water and the harmful substances in liquid phase, the PH value and the water turbidity. The weather monitoring and detecting module 814 can collect the atmospheric pressure to calculate the wind speed, the wind direction and the altitude. The air quality monitoring and detecting module 815 can detect the content of carbon dioxide, the humidity and the temperature. The water datasets, the weather datasets and the air datasets can be sent to the unmanned aerial vehicle 700 via the LoRa transmitting module 812 for latter research.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A buoy position monitoring method, comprising:
   a buoy position monitoring step, wherein a plurality of buoys are put on a water surface, each of the buoys is capable of sending a detecting signal, and each of the detecting signals is sent periodically and comprises a position dataset of each of the buoys;
   an unmanned aerial vehicle receiving step, wherein an unmanned aerial vehicle is disposed on an initial position, and the unmanned aerial vehicle receives the detecting signals; and
   an unmanned aerial vehicle flying step, wherein when at least one of the buoys is lost, the unmanned aerial vehicle flies to a predetermined position to get contact with the at least one buoy that is lost, when at least two of the buoys are lost, each of the at least two buoys that are lost is given a weight according to a lost time period thereof, the predetermined position is calculated according to the weights and last positions of the at least two buoys that are lost, and each of the position datasets sent by each of the at least two buoys that are lost to the unmanned aerial vehicle just before each of the lost time periods is defined as the last position, wherein the weight is determined by a ratio of each of the lost time periods of each of the lost buoys, each of the lost time periods being divided by a sum of all of the lost time periods determined from all of the lost buoys.

2. The buoy position monitoring method of claim 1, wherein, in the unmanned aerial vehicle flying step, as the unmanned aerial vehicle arrives the predetermined position, a plurality of requesting signals are sent to the at least two buoys that are lost, and each of the at least two buoys that are lost sends a feedback signal with a plurality of stored position datasets detected during the lost time period to the unmanned aerial vehicle after receiving the requesting signal.

3. The buoy position monitoring method of claim 2, wherein, in the unmanned aerial vehicle flying step, after the unmanned aerial vehicle receives the stored position datasets detected during the lost time periods from the at least two buoys that are lost, the predetermined position is recalculated as long as at least another one of the buoys is lost.

4. The buoy position monitoring method of claim 1, further comprising:
   a real time positioning station calibrating step, wherein a real time positioning station is provided, and a coordinate of the real time positioning station is calibrated.

5. The buoy position monitoring method of claim 4, wherein, in the buoy positioning step, a GPS dataset is sent by each of the buoys to the real time positioning station, a differential correction corresponding to each of the GPS datasets is sent by the real time positioning station to each of the buoys, and the position dataset of each of the buoys is calculated according to the GPS dataset of each of the buoys and the differential correction corresponding thereto.

6. A buoy position monitoring system, comprising:
   a plurality of buoys, each of the buoys comprising:
      a detecting and communicating unit capable of sending a detecting signal, wherein the detecting signal comprises a position dataset; and
   an unmanned aerial vehicle, comprising a communicating unit signally connected to the detecting and communicating unit, wherein the communicating unit receives the detecting signals;
   wherein when at least one of the buoys is lost, the unmanned aerial vehicle flies to a predetermined position to get contact with the at least one buoy that is lost, when at least two of the buoys are lost, each of the at least two buoys that are lost is given a weight according to a lost time period thereof, the predetermined position is calculated according to the weights and last positions of the at least two buoys that are lost, and each of the position datasets sent by each of the at least two buoys that are lost to the unmanned aerial vehicle just before each of the lost time periods is defined as the last position, wherein the weight is determined by a ratio of each of the lost time periods of each of the lost buoys, each of the lost time periods being divided by a sum of all of the lost time periods determined from all of the lost buoys.

7. The buoy position monitoring system of claim 6, further comprising:
- a real time positioning station signally connected to the buoys, wherein a GPS dataset is sent by each of the buoys to the real time positioning station, and a differential correction corresponding to each of the GPS datasets is sent by the real time positioning station to each of the buoys;
- wherein the position dataset of each of the buoys is calculated according to the GPS dataset of each of the buoys and the differential correction corresponding thereto.

8. The buoy position monitoring system of claim 7, wherein each of the detecting and communicating unit comprises:
- a position detecting module configured to obtain the GPS dataset, the position detecting module signally connected to the real time positioning station, the position detecting module calculating the position dataset according to the GPS dataset and the differential correction corresponding thereto; and
- a LoRa transmitting module signally connected to the position detecting module and configured to send the detecting signal.

9. The buoy position monitoring system of claim 8, wherein each of the detecting and communicating unit further comprises:
- a water quality monitoring and detecting module configured to provide a water dataset and signally connected to the LoRa transmitting module;
- a weather monitoring and detecting module configured to provide a weather dataset and signally connected to the LoRa transmitting module; and
- an air quality monitoring and detecting module configured to provide an air dataset and signally connected to the LoRa transmitting module;
- wherein each of the detecting signals comprises the water dataset, the weather dataset and the air dataset.

* * * * *